US011573757B2

(12) United States Patent
Matsushita et al.

(10) Patent No.: US 11,573,757 B2
(45) Date of Patent: *Feb. 7, 2023

(54) COMMUNICATION APPARATUS, CONTROL METHOD, AND PROGRAM FOR CONNECTING AT LEAST TWO TYPES OF WIRELESS COMMUNICATION UNITS ACCORDING TO AN OPERATIVE STATE OF AN ACCESS POINT

(71) Applicant: CANON KABUSHIKI KAISHA, Tokyo (JP)

(72) Inventors: Takeshi Matsushita, Fujisawa (JP); Mitsuru Konji, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/348,020

(22) Filed: Jun. 15, 2021

(65) Prior Publication Data

US 2021/0311680 A1 Oct. 7, 2021

Related U.S. Application Data

(63) Continuation of application No. 16/728,729, filed on Dec. 27, 2019, now Pat. No. 11,048,458, which is a (Continued)

(30) Foreign Application Priority Data

Jun. 6, 2014 (JP) .................................. 2014-117848
Jan. 26, 2015 (JP) .................................. 2015-012709

(51) Int. Cl.
*G06F 3/12* (2006.01)
*H04W 4/80* (2018.01)

(52) U.S. Cl.
CPC .......... *G06F 3/1292* (2013.01); *G06F 3/1204* (2013.01); *G06F 3/1236* (2013.01); *H04W 4/80* (2018.02)

(58) Field of Classification Search
CPC ....... H04L 63/102; H04L 63/08; H04L 63/20; H04L 63/0428; H04N 1/00347;
(Continued)

(56) References Cited

U.S. PATENT DOCUMENTS 11,048,458 B2 * 6/2021 Matsushita ........... G06F 3/1236
2014/0268235 A1 * 9/2014 Chiou ................... G06F 3/1292
358/1.15

(Continued)

FOREIGN PATENT DOCUMENTS

JP 2019-193282 A 10/2019

*Primary Examiner* — Juan M Guillermety
(74) *Attorney, Agent, or Firm* — Canon U.S.A., Inc., IP Division

(57) ABSTRACT

A communication apparatus capable of performing near field communication acquires communication information of a target apparatus through the near field communication, determines whether or not the target apparatus is connected to an access point to which the communication apparatus is connected, on the basis of the communication information, and accepts the target apparatus as a target to which the communication apparatus is to be connected by using a peer-to-peer communication system, when it is determined that the target apparatus is not connected to the access point to which the communication apparatus is connected.

19 Claims, 10 Drawing Sheets

Related U.S. Application Data continuation of application No. 14/729,978, filed on Jun. 3, 2015, now abandoned.

(58) Field of Classification Search
CPC . H04N 1/00925; H04N 1/4433; H04W 12/08; H04W 12/06; H04W 8/005; H04W 76/023; H04W 76/048; H04W 76/02; H04W 84/18; H04W 4/80; H04W 40/02; H04W 74/02; H04W 76/10; H04W 76/14; H04W 76/15; H04W 84/12; G06F 21/608; G06F 21/44; G06F 3/1222; G06F 3/1238; G06F 3/1292; G06F 3/1231; G06F 3/122
See application file for complete search history.

(56) References Cited

U.S. PATENT DOCUMENTS

| | | | |
|---|---|---|---|
| 2014/0293331 A1* | 10/2014 | Asai | G06F 3/1292 358/1.15 |
| 2015/0038086 A1* | 2/2015 | Kim | G06F 21/35 455/41.3 |

* cited by examiner

COMMUNICATION APPARATUS, CONTROL METHOD, AND PROGRAM FOR CONNECTING AT LEAST TWO TYPES OF WIRELESS COMMUNICATION UNITS ACCORDING TO AN OPERATIVE STATE OF AN ACCESS POINT

CROSS-REFERENCE TO RELATED APPLICATIONS

The present application is a continuation of U.S. patent application Ser. No. 16/728,729, filed on Dec. 27, 2019, now U.S. Pat. No.: 11,048,458, issued Jun. 29, 2021, which is a continuation of U.S. patent application Ser. No. 14/729,978, filed on Jun. 3, 2015, now abandoned, which claims priority from Japanese Patent Application No. 2014-117848 filed Jun. 6, 2014 and Japanese Patent Application No. 2015-012709 filed Jan. 26, 2015. All of the above-listed applications are hereby incorporated by reference herein in their entireties.

BACKGROUND OF THE INVENTION

Field of the Invention

The present invention relates to communication apparatuses, and particularly to a communication technology in which near field communication is enabled.

Description of the Related Art

Recently, external apparatuses, such as a digital camera and a mobile telephone, specify communication targets with which communication is to be performed, by using a near field communication system including near field communication (NFC). Systems are known which output image files held in a digital camera or a mobile telephone by using an image output apparatus through wireless communication other than near field communication.

As part of a network function, some systems have a remote print function and a firmware update function which are performed via the Internet by establishing a connection to the Internet via an access point. Even in a state in which no access points are present, a host terminal may use an access point function provided for an image output apparatus, so as to establish a peer-to-peer (P2P) connection between the host terminal and the image output apparatus, thereby performing printing and scanning. A mode in which a host terminal performs wireless communication in a P2P manner by using the access point function provided for an image output apparatus is called the access point (AP) mode.

However, when the image output apparatus enters the AP mode, the image output apparatus is connected to the host terminal in a P2P manner, and the connection to an access point is interrupted, whereby the Internet connection fails to work. As a result, the image output apparatus may fail to use the above-described various functions which need the Internet connection.

When the connection target in a P2P connection fails to connect to the Internet, the host terminal operating in the AP mode will also fail to connect to the Internet. In this condition, an application in the host terminal also fails to access the Internet. For example, sites on the Internet fail to be viewed from a browser.

In Japanese Patent Laid-Open No. 2011-182449, a technique is disclosed in which, when a first wireless communication apparatus is moved close to a second wireless communication apparatus, if the first wireless communication apparatus is performing data communication via an access point, the first wireless communication apparatus does not switch to a P2P connection to the second wireless communication apparatus.

However, in the technique in Japanese Patent Laid-Open No. 2011-182449, when the first wireless communication apparatus does not perform data communication with the Internet via an access point, the communication setting of the first wireless communication apparatus is changed to P2P connection. For example, when the first wireless communication apparatus receives a connection request from the second wireless communication apparatus in the state in which the first wireless communication apparatus does not perform data communication with the Internet via an access point, the first wireless communication apparatus switches to P2P connection. After that, even when a user wants to get connected to the Internet by using the first wireless communication apparatus while the first and second communication apparatuses are connected to each other in a P2P manner, the user needs to wait until the P2P connection ends, in order to perform an operation intended by the user. Therefore, customer convenience may be reduced.

SUMMARY OF THE INVENTION

The present invention provides a communication apparatus capable of performing near field communication. The communication apparatus includes an acquiring unit, a determination unit, and an accepting unit. The acquiring unit acquires communication information of a target apparatus through the near field communication. The determination unit determines whether or not the target apparatus is connected to an access point to which the communication apparatus is connected, on the basis of the communication information. The accepting unit accepts the target apparatus as a target to which the communication apparatus is to be connected by using a peer-to-peer communication system, when it is determined that the target apparatus is not connected to the access point to which the communication apparatus is connected.

Further features of the present invention will become apparent from the following description of exemplary embodiments with reference to the attached drawings.

BRIEF DESCRIPTION OF THE DRAWINGS

FIGS. 9A to 9E are diagrams illustrating exemplary user interfaces (UIs) of the terminal.

DESCRIPTION OF THE EMBODIMENTS

Exemplary embodiments of the invention will be described below in detail with reference to the drawings. Unless otherwise specified, it is not intended that the scope of the invention be not limited to the relative configuration of the components, the display screens, and the like which are described in the present embodiments. Each of the embodiments of the present invention described below can be implemented solely or as a combination of a plurality of the embodiments or features thereof where necessary or where the combination of elements or features from individual embodiments in a single embodiment is beneficial.

First Embodiment

Figure 1:
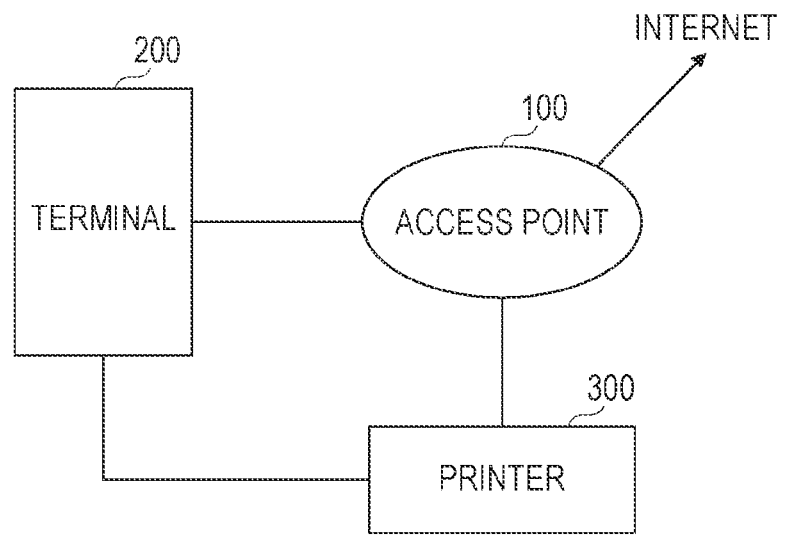
FIG. 1 is a diagram illustrating the configuration of a print system according to an embodiment of the present invention.

FIG. 1 is a diagram illustrating the configuration of a print system. The system includes an access point 100 located at the center, and also includes a mobile terminal 200 and a printer 300 which are connectable to the access point 100. The terminal 200 which also serves as a communication apparatus includes at least two types of wireless communication units whose communication speeds are different from each other. As long as the terminal 200 is an apparatus which can handle files to be printed, such as a personal information terminal, e.g., a personal digital assistant (PDA), a mobile telephone, and a digital camera, any type of apparatus may be used.

The printer 300 which also serves as a communication apparatus has a reading function of reading a document on the platen glass, and a print function of performing printing by using a print engine such as an ink-jet print engine. In addition, the printer 300 may have a facsimile (FAX) function and a telephone function.

The printer 300 is capable of establishing a wireless local-area network (LAN) connection in the infrastructure mode. That is, the printer 300 which is operating in the infrastructure mode is capable of performing wireless communication with the terminal 200 via the external access point 100. The printer 300 also has the AP mode. In the AP mode, the terminal 200 and the printer 300 are also capable of performing P2P communication with each other through a wireless LAN. As described above, in the AP mode, the access point function provided for a printer is activated, and the terminal 200 uses the access point of the printer to perform wireless peer-to-peer communication with the printer.

Figure 2:
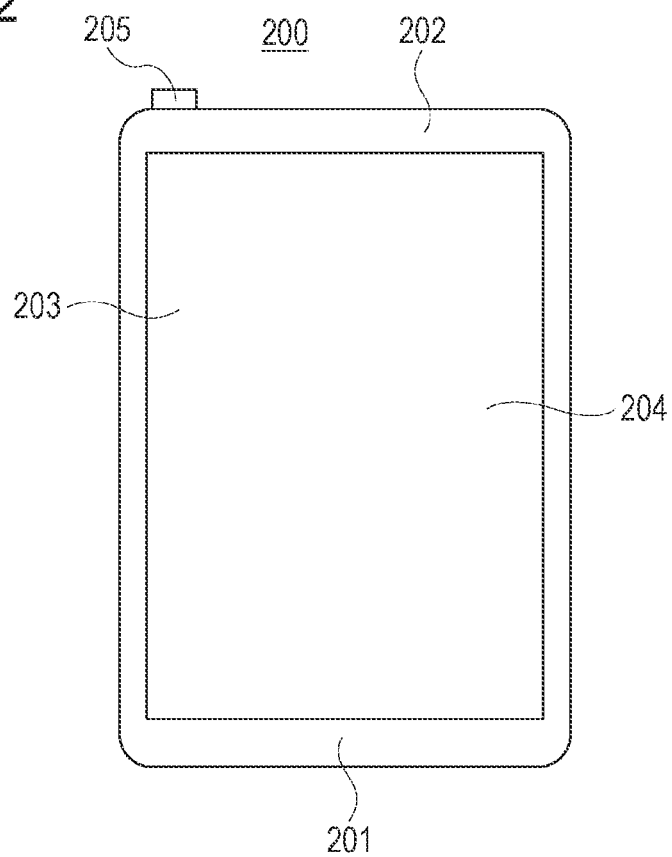
FIG. 2 is a diagram illustrating an outer appearance of a terminal.

FIG. 2 is a diagram illustrating an outer appearance of the terminal 200. In the first embodiment, a smartphone is taken as an example. A smartphone is a multi-function mobile telephone provided with a camera, a net browser, a mail function, and the like as well as a mobile telephone function. An NFC unit 201 performs near field communication. A user brings the NFC unit 201 to the vicinity of an NFC unit of a target (in the first embodiment, an NFC unit of the printer 300) within a predetermined distance (about 10 cm), enabling communication to be performed. That is, the terminal 200 is capable of performing near field communication.

A wireless LAN unit 202 which performs communication through a wireless LAN is disposed in the terminal 200. A display unit 203 is a display provided with, for example, a display mechanism using a liquid crystal display (LCD) system. An operation unit 204 is provided with an operation mechanism using a touch panel system, and detects a pressing operation performed by a user. In a typical operation, the display unit 203 displays button icons and a software keyboard, and a user presses the operation unit 204, whereby an event of pressing a button is issued. A power supply key 205 is used when the power supply is turned on or off.

Figure 3A:
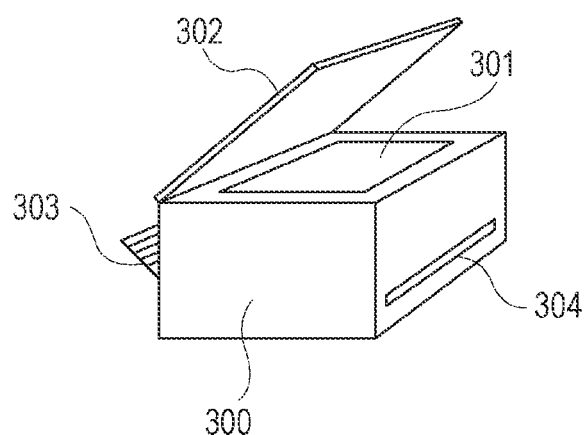
FIGS. 3A and 3B are diagrams illustrating outer appearances of a printer.
Figure 3B:
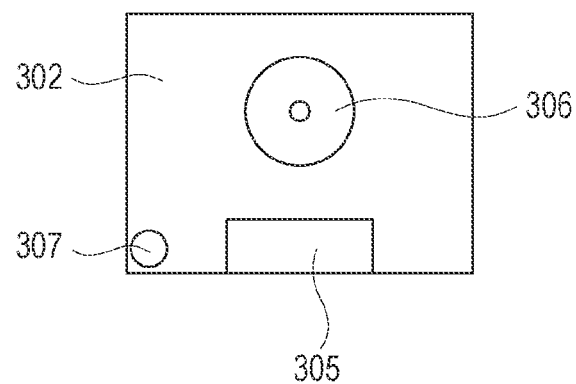

FIGS. 3A and 3B are diagrams illustrating outer appearances of the printer 300. In the first embodiment, a multi-function printer (MFP) having a reading function (scanner) is taken as an example. In FIG. 3A, platen glass 301 which is a transparent glass plate is used when a document is put on the plate so as to be scanned by using the scanner. A platen cover 302 prevents reading light from being emitted to the outside when the scanner is used to perform a reading operation. A print-sheet input slot 303 is an input slot for setting various sizes of sheets of paper. Sheets of paper which are set in the print-sheet input slot 303 are conveyed to the print unit one by one, are subjected to printing, and are discharged from a print-sheet output slot 304.

In FIG. 3B, an operation display unit 305 and an NFC unit 306 are disposed on the top of the platen cover 302. The NFC unit 306 which performs near field communication is a portion of the printer 300, to the vicinity of which a user brings the terminal 200. The effective distance of the contact is a predetermined distance (about 10 cm) from the NFC unit 306. A wireless LAN antenna 307 is embedded to perform wireless LAN communication.

Near field communication means wireless communication which is typified by NFC and whose communication range is a predetermined range which is relatively small (for example, several centimeters to 1 m).

Figure 4:
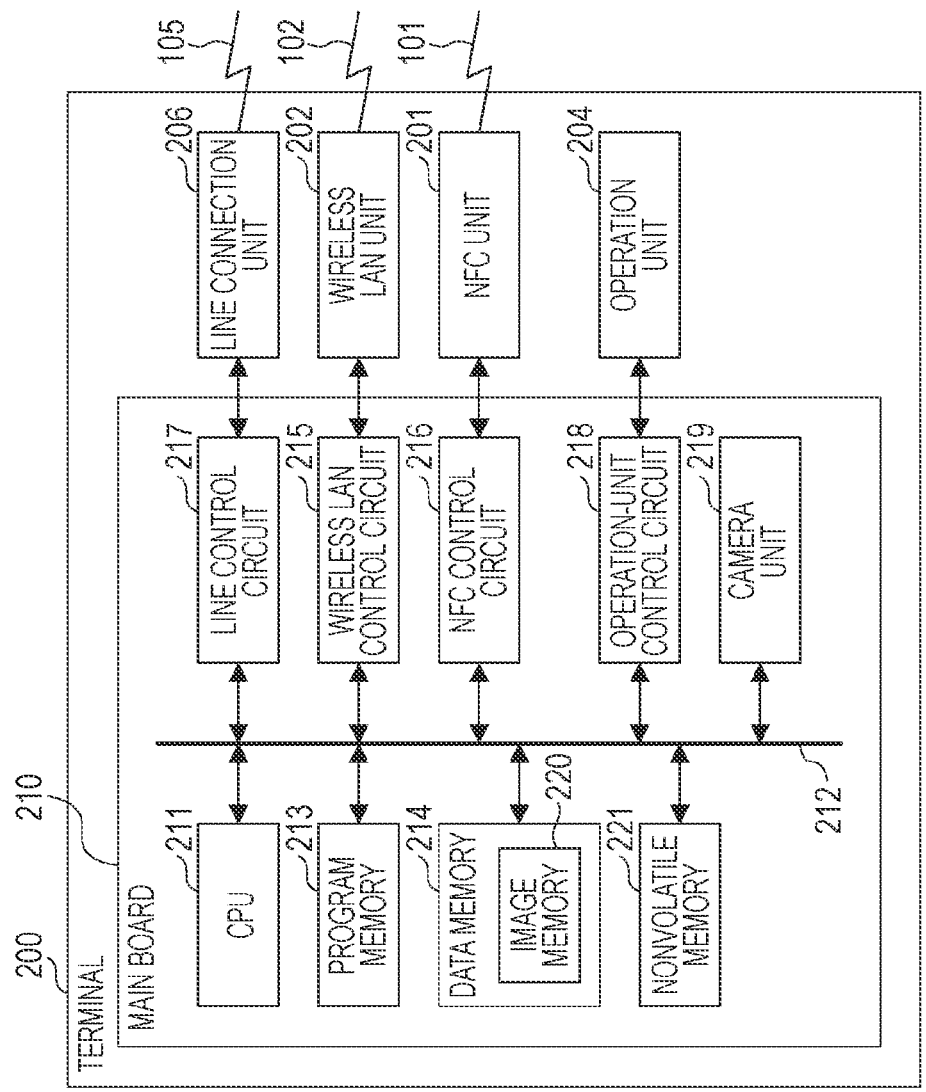
FIG. 4 is a block diagram illustrating the configuration of the terminal.

FIG. 4 is a block diagram illustrating the configuration of the terminal 200. The terminal 200 includes a main board 210 which controls the entire apparatus, the wireless LAN unit 202, the NFC unit 201, a line connection unit 206, the operation unit 204, and the display unit. Each of the wireless LAN unit 202, the NFC unit 201 and the line connection unit 206 serves as a communication unit of the terminal 200.

A central processing unit (CPU) 211 which is a microprocessor disposed in the main board 210 operates according to a control program stored in a program memory 213 which is a read-only memory (ROM) and which is connected to the CPU 211 via an internal bus 212, and according to the information in a data memory 214 which is a random-access memory (RAM).

The CPU 211 controls the wireless LAN unit 202 via a wireless LAN control circuit 215, thereby communicating with another communication terminal through a wireless LAN 102. The CPU 211 controls the NFC unit 201 via an NFC control circuit 216, thereby enabling detection of a connection to another NFC terminal through NFC 101 and enabling reception/transmission of data from/to another NFC terminal. The CPU 211 controls the line connection unit 206 via a line control circuit 217, whereby a connection to a mobile phone network 105 is established, enabling phone calls to be made and enabling data to be received/transmitted.

The CPU 211 controls an operation-unit control circuit 218, thereby enabling displaying to be performed on the operation unit 204 and enabling an operation to be received from a user. The CPU 211 controls a camera unit 219 so that an image is captured, and stores the captured image in an image memory 220 in the data memory 214. Other than captured images, the CPU 211 is capable of storing images obtained from the outside through the mobile phone network 105 or the wireless LAN 102 in the image memory 220, and of, in contrast, transmitting images to the outside.

A nonvolatile memory 221 including a memory such as a flash memory stores data which is to be kept in the memory even after the power supply is turned off. For example, in addition to telephone book data, various types of communication connection information, information about devices which were connected to the terminal 200, or the like, image data to be kept in the memory and a program such as application software for achieving various functions in the terminal 200 are stored.

Figure 5:
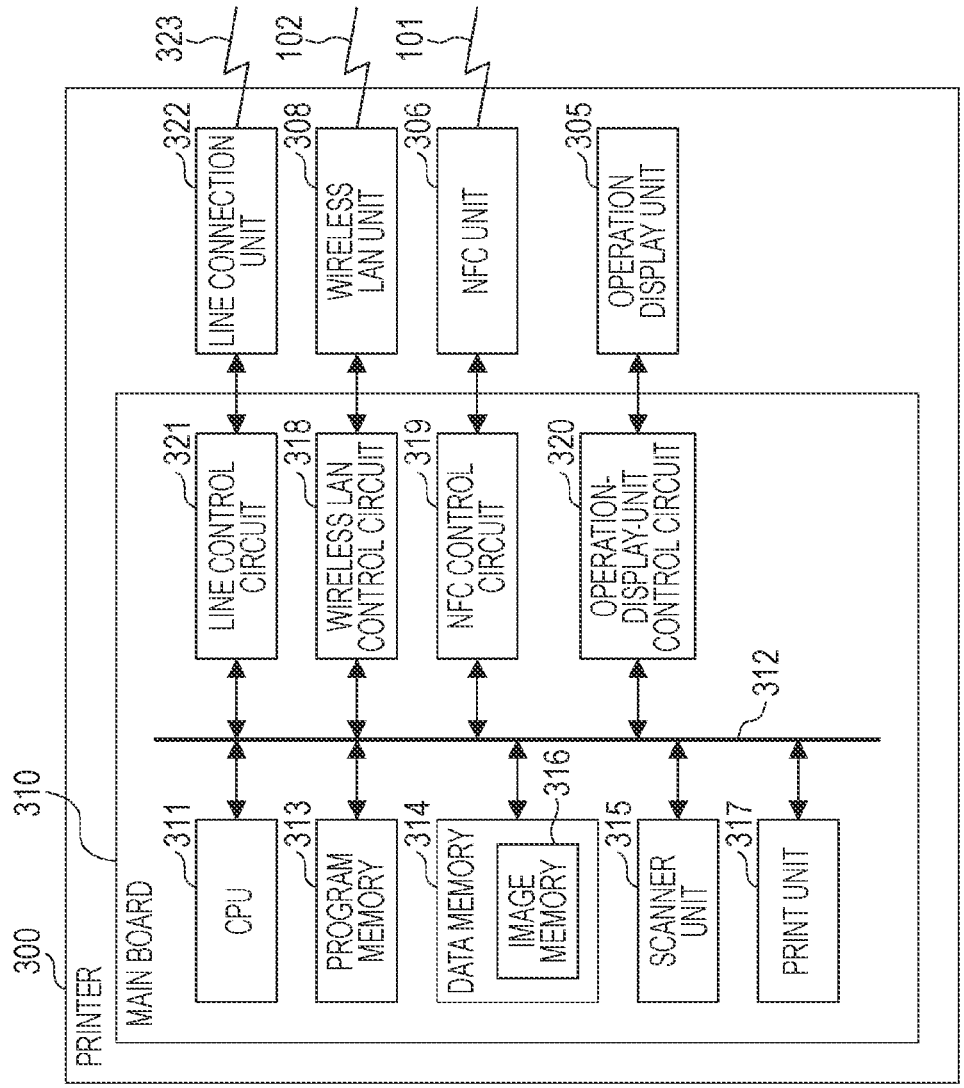
FIG. 5 is a block diagram illustrating the configuration of the printer.

FIG. 5 is a block diagram illustrating the configuration of the printer 300. The printer 300 includes a main board 310 which controls the entire apparatus, a line connection unit 322, a wireless LAN unit 308, the NFC unit 306, and the operation display unit 305. The line connection unit 322, the wireless LAN unit 308, and the NFC unit 306 serve as communication units of the printer 300.

A CPU 311 which is a microprocessor disposed in the main board 310 operates according to a control program stored in a program memory 313 which is a ROM and which is connected to the CPU 311 via an internal bus 312, and according to the information in a data memory 314 which is RAM.

The CPU 311 controls a scanner unit 315 so that a document is read, and stores the read document in an image memory 316 in the data memory 314. The CPU 311 controls a print unit 317, thereby enabling an image in the image memory 316 in the data memory 314 to be printed on a recording medium.

The CPU 311 controls the wireless LAN unit 308 through a wireless LAN control circuit 318, thereby enabling communication with another communication terminal to be performed through the wireless LAN 102. The CPU 311 controls the NFC unit 306 through an NFC control circuit 319, thereby enabling detection of a connection to another NFC terminal through the NFC 101 and enabling reception/transmission of data from/to another NFC terminal. The CPU 311 controls the line connection unit 322 through a line control circuit 321, whereby a connection to a telephone network 323 is established, enabling FAX reception/transmission and data reception/transmission.

The CPU 311 controls an operation-display-unit control circuit 320, thereby enabling the state of the printer 300 or a menu for selecting a function to be displayed on the operation display unit 305 and enabling an operation to be received from a user.

Figure 6:
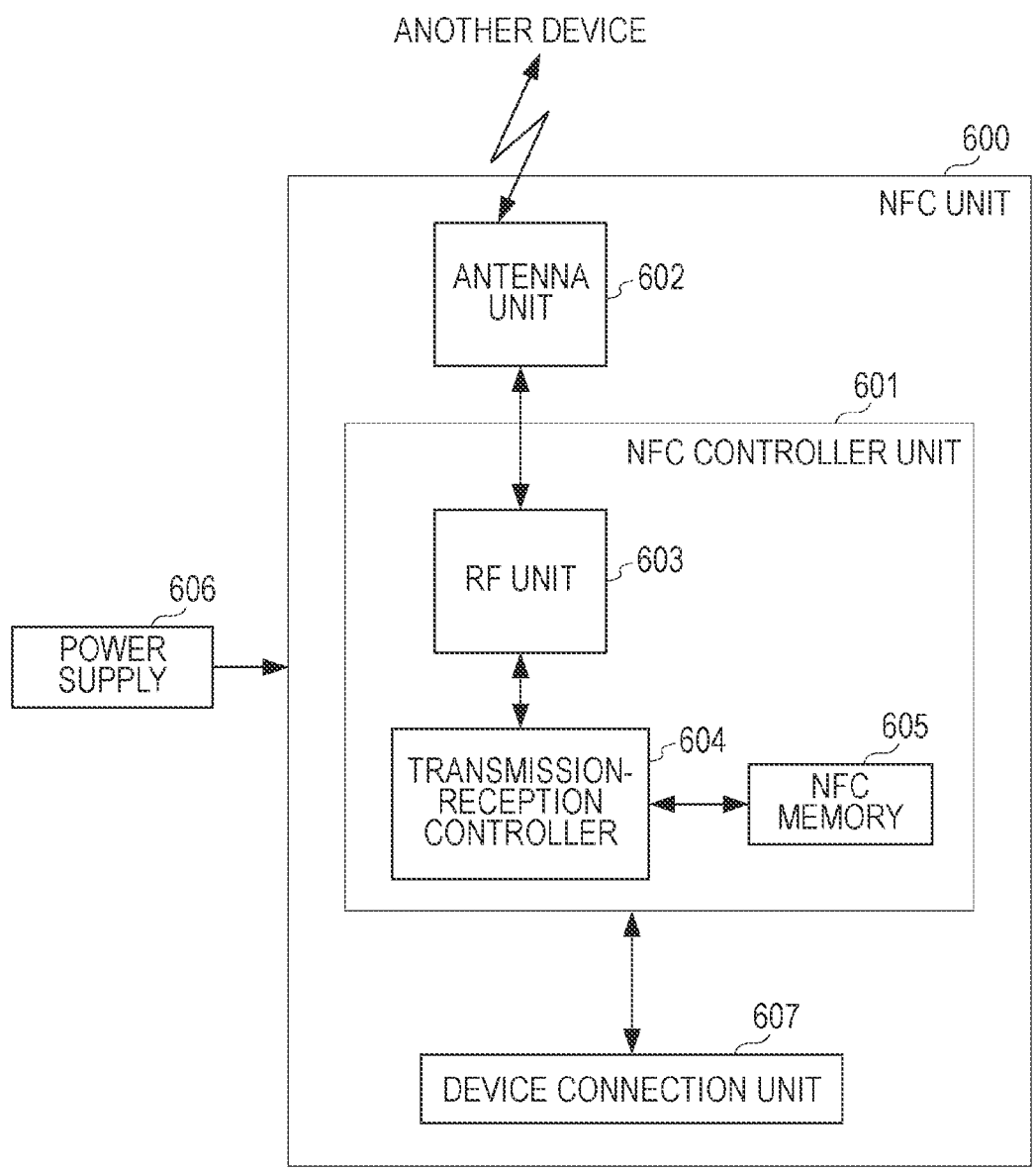
FIG. 6 is a block diagram illustrating the configuration of an NFC unit.

FIG. 6 is a block diagram illustrating the detail of an NFC unit 600 used as the NFC unit 201 or the NFC unit 306.

In NFC communication, when near field communication is performed using the NFC unit 600, an apparatus which outputs a radio frequency (RF) field at first to start communication is called an initiator. An apparatus which responds to a command submitted from the initiator and which communicates with the initiator is called a target.

The NFC unit 600 includes an NFC controller unit 601, an antenna unit 602, an RF unit 603, a transmission-reception controller 604, an NFC memory 605, a power supply 606, and a device connection unit 607. The antenna unit 602 receives radio waves from another NFC device, and transmits radio waves to another NFC device. The RF unit 603 is provided with a function of modulating an analog signal to a digital signal and demodulating a digital signal to an analog signal. The RF unit 603 which includes a synthesizer identifies bands and the frequencies of channels, and controls the bands and the channels by using frequency allocating data.

The NFC memory 605 includes, for example, a nonvolatile memory. Data stored in the NFC memory 605 may be read and written even in a state in which power from the power supply is not supplied. The control of storing data, including reading and writing data from/to the NFC memory 605, is achieved by the NFC controller unit 601.

The transmission-reception controller 604 controls operations for reception/transmission, such as construction and decomposition of a reception/transmission frame, addition and detection of a preamble, and frame identification. The transmission-reception controller 604 also controls the NFC memory 605, and reads/writes various data and programs. When operations are performed in the active mode in which bi-directional communication with a device is enabled, power is supplied via the power supply 606. In addition, communication with another device is performed through the device connection unit 607, and communication with another NFC device located within a range in which communication may be performed is performed by using radio waves received/transmitted through the antenna unit 602.

In the first embodiment, the terminal 200 and a printer need to perform bi-directional communication through NFC. Therefore, the NFC always operates in the active mode.

In the description below, an operation in which the NFC unit 201 of the terminal 200 is brought to the vicinity of the NFC unit 306 of the printer 300 is denoted as an "NFC touch operation".

In the first embodiment, the following use case will be described. A user selects images to be printed, by operating the terminal 200. Then, the user performs an NFC touch operation on the printer 300, using which printing is to be performed, whereby the selected images are printed by using the printer 300.

When the printer 300 is present in the same network as the terminal 200, printing is performed while the connection state is maintained. Otherwise, a P2P connection to the printer 300 is established, and printing is performed.

Figure 7:
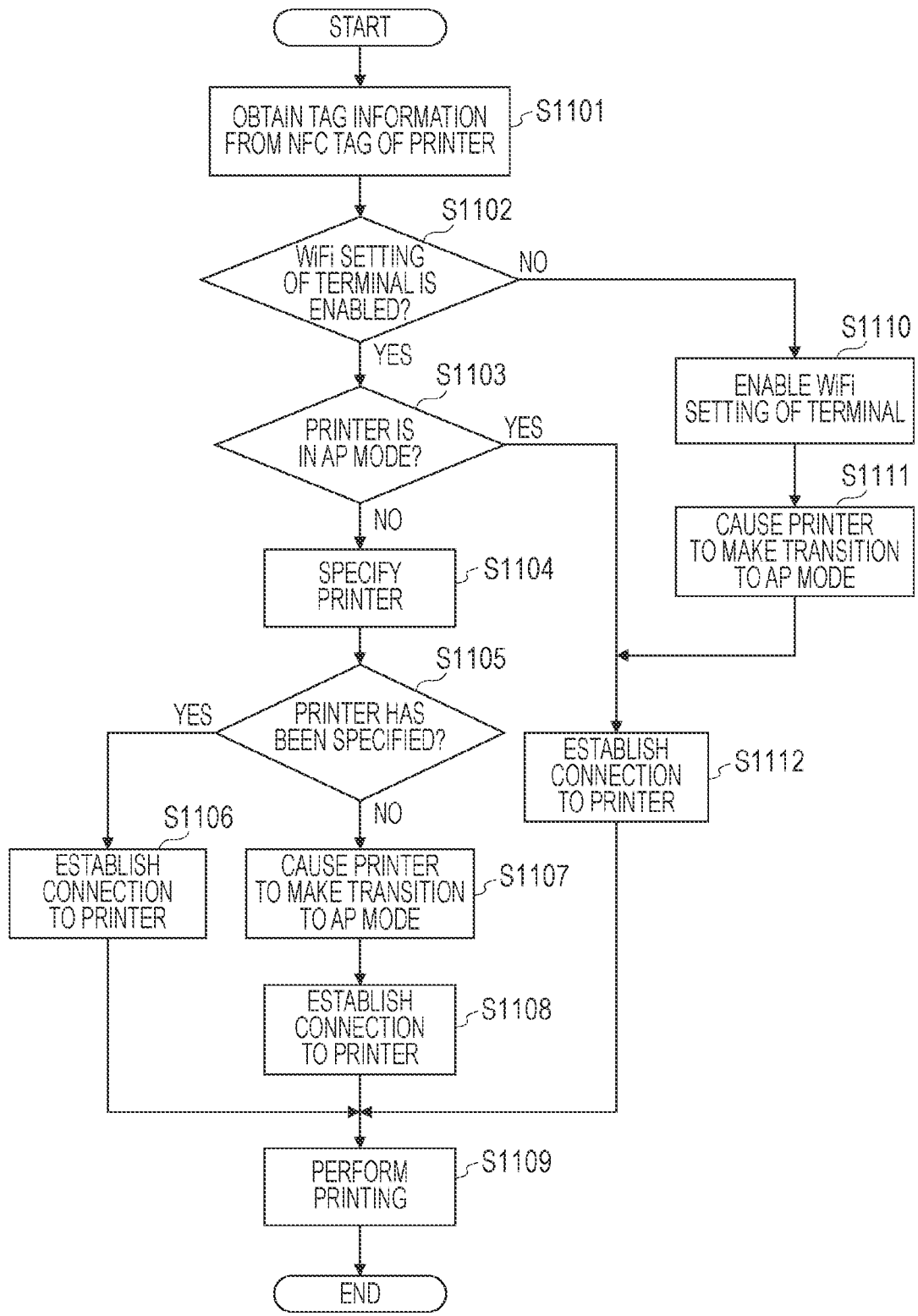
FIG. 7 is a flowchart of a process performed in a first embodiment.

By using the flowchart in FIG. 7, the first embodiment will be described. FIG. 7 illustrates a process performed when images specified by using the terminal 200 are printed by using the printer 300. Steps in the flowchart which are related to the terminal 200 in the present application are achieved by the CPU 211 reading programs associated with the flowchart and executing the programs.

A user operates the terminal 200, selects image data, and performs an NFC touch operation on the printer 300. FIGS. 9A to 9E illustrate UI examples of the terminal 200. For example, a user actives a print application installed in the terminal 200, whereby the selection screen (selection UI) in FIG. 9B is displayed. In the UI in FIG. 9B, thumbnail images of image data in the terminal 200 are displayed. When a user taps the thumbnails of images to be printed, with a touch operation, check marks indicating selection are displayed on the thumbnails. In the state in which the images are selected, when the user performs an NFC touch operation on the printer 300, a printing operation is started.

In step S1101, the terminal 200 obtains tag information from the NFC tag of the printer 300. The tag information includes at least three types of information about network settings of the printer 300. Specifically, the three types of information are (1) the MAC address of the printer 300, (2) the SSID and the password used when the printer 300 is in the AP mode, and (3) the current wireless mode of the printer 300. The current wireless mode in the information (3) is either one of the AP mode and the infrastructure mode. The tag information in the present application may be simply called communication information since the tag information is information about communication.

In step S1102, the terminal 200 checks whether or not the wireless fidelity (WiFi) setting is enabled. The WiFi setting being enabled means that WiFi communication is allowed to be performed in the terminal 200. If the WiFi setting is enabled, the process proceeds to step S1103. If the WiFi setting is disabled, the process proceeds to step S1110.

In step S1103, the terminal 200 checks the current wireless mode of the printer 300 which is included in the information (3) obtained in step S1101. If the current wireless mode is the AP mode, the process proceeds to step S1112. If the current wireless mode is the infrastructure mode, the process proceeds to step S1104. That is, if the terminal 200 determines that the printer 300 is operating by using the peer-to-peer communication system, the terminal 200 proceeds the process to step S1112.

In step S1104, the terminal 200 detects a printer 300 whose MAC address matches the MAC address of the printer 300 which is included in the information (1) obtained in step S1101. Specifically, the terminal 200 transmits a device search command by broadcast to the network joined by the terminal 200, and receives responses from apparatuses joining the network. The terminal 200 detects a response including a MAC address matching the MAC address obtained in step S1101, thus performing the process in step S1104.

If a printer 300 is detected in step S1104, the terminal 200 establishes a wireless LAN connection to the printer 300 detected in step S1104, by using the wireless LAN unit 202 in step S1106. Specifically, the terminal 200 determines (keeps) the access point 100 to which the terminal 200 has been connected, as a target to be connected. In step S1109, the terminal 200 transmits a print job to the printer 300 through the wireless LAN via the access point 100. Specifically, the terminal 200 issues a specific command to the printer 300, thereby establishing a session with the printer 300. The terminal 200 generates the print job on the basis of the image data selected in the selection screen in FIG. 9B, and transmits the print job in step S1109. The timing of generating a print job may be set before the flowchart in FIG. 7 is performed, or after a connection is established in step S1106.

The printer 300 which has received the print job prints the images on paper on the basis of the print job, and the process ends.

If a printer 300 is not detected in step S1104, the process of the terminal 200 proceeds to steps S1105 to S1107.

In step S1107, the terminal 200 writes an instruction to make a transition to the AP mode, in the NFC tag of the printer 300. The information written as an instruction to make a transition may be a command to make a transition to the AP mode or may be information indicating that a printer corresponding to the MAC address has not been found. When the printer 300 detects an instruction to make a transition to the AP mode, which is written in the NFC tag, the printer 300 makes a transition to the AP mode.

In step S1108, using the SSID and the password of the access point of the printer 300 which are included in the information (2) obtained in step S1101, the terminal 200 establishes a wireless LAN connection to the printer 300 which has made a transition to the AP mode in step S1107. Specifically, the terminal 200 changes the access-point connection target from the access point 100 to the access point of the printer 300. That is, in step S1108, the access point of the printer 300 is determined to be the access-point connection target. This process causes a P2P connection between the terminal 200 and the printer 300 to be established, and the terminal 200 transmits the print job to the printer 300 in step S1109. The process performed by the printer 300 which has received the print job is the same as the above-described process. In the case where the printer 300 is already in the AP mode when an NFC touch operation is performed, the process proceeds to step S1109 via step S1112. The wireless mode of the printer 300 is obtained in the process in step S1101.

If the process proceeds to step S1110 in step S1102, the terminal 200 changes the WiFi setting of the terminal 200 to enabled in step S1110. In step S1111, the terminal 200 writes an instruction to make a transition to the AP mode, in the NFC tag of the printer 300. When the printer 300 detects an instruction to make a transition to the AP mode, which is written in the NFC tag, the printer 300 performs a process of making a transition to the AP mode.

The process in step S1112 which is the same process as that in step S1106 will not be described.

If the process proceeds to step S1112 in step S1103, the printer 300 is already in the AP mode. Therefore, using the SSID and the password which are used when the printer 300 is in the AP mode and which are included in the information (2) obtained in step S1101, the terminal 200 establishes a connection to the printer 300, and transmits the print job to the printer 300 in step S1109. The printer 300 which has received the print job performs a print process, and the process ends.

The steps in the flowchart in FIG. 7 may be executed by a print application providing the screens in FIGS. 9A to 9E.

According to a series of processes illustrated in the above-described flowchart, when a connection between the printer 300 and the terminal 200 has been established in the infrastructure mode, printing is performed while the connection state is maintained. In contrast, when a connection between the printer 300 and the terminal 200 has not been established in the infrastructure mode, the terminal 200 instructs the printer 300 to make a transition to the AP mode, and performs printing.

As a result, a connection in the infrastructure mode is maintained as long as possible. Accordingly, connections to the Internet from the printer 300 and the terminal 200 may be also maintained as long as possible.

A user may easily set the WiFi setting of the terminal 200 enabled or disabled at any timing by using a WiFi setting item in the system setting menu in the terminal 200. A user who does not own the access point 100 does not need to establish a WiFi connection between the access point 100 and the terminal 200. Therefore, to reduce consumption of the battery of the terminal 200 which is caused by unnecessary functions, the WiFi setting of the terminal 200 may be highly likely to be set disabled. Even in this case, the terminal 200 checks the WiFi setting in step S1102. When the WiFi setting is disabled, the terminal 200 sets the WiFi setting enabled, and establishes a wireless connection to the printer 300 in the AP mode, thereby enabling printing to be performed in the AP mode.

In step S1103, the terminal 200 checks the wireless mode of the printer 300. When the printer 300 is determined to already operate in the AP mode, the terminal 200 does not perform the detection process in which a printer 300 is unlikely to be found. According to the above-described process, a connection between the printer 300 and the terminal 200 may be effectively established.

As described above, the process of checking if the WiFi setting of the terminal 200 is enabled in step S1102 and the process of checking the wireless mode of the printer 300 in step S1103 are not necessary in the present invention, and are performed to improve customer convenience, such as making the process faster. Therefore, even when both or one of steps S1102 and S1103 is not performed, the present invention may achieve an effect of maintaining a connection in the infrastructure mode as long as possible.

The process flow of the first embodiment will be described by using the screens displayed on the mobile terminal 200.

Figure 9C:
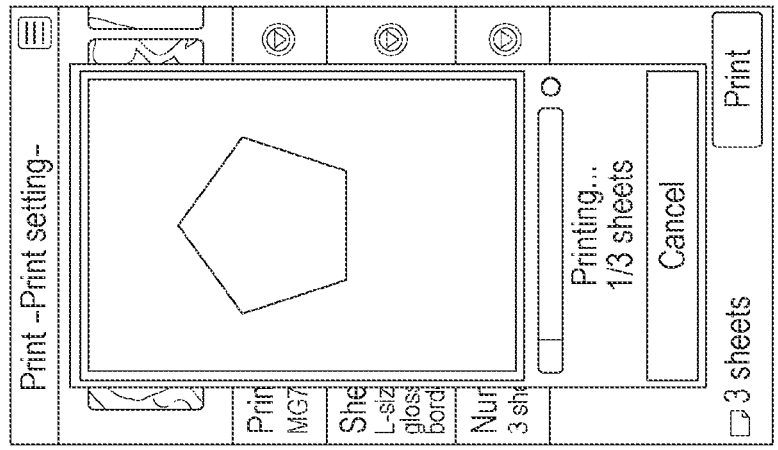
Figure 9B:
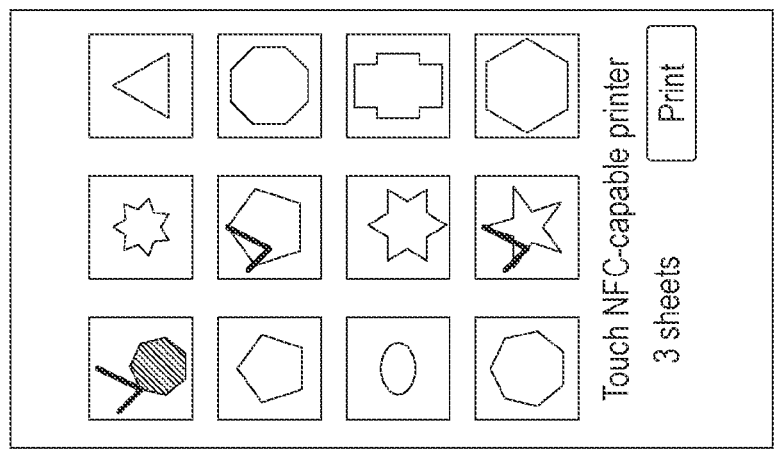
Figure 9A:
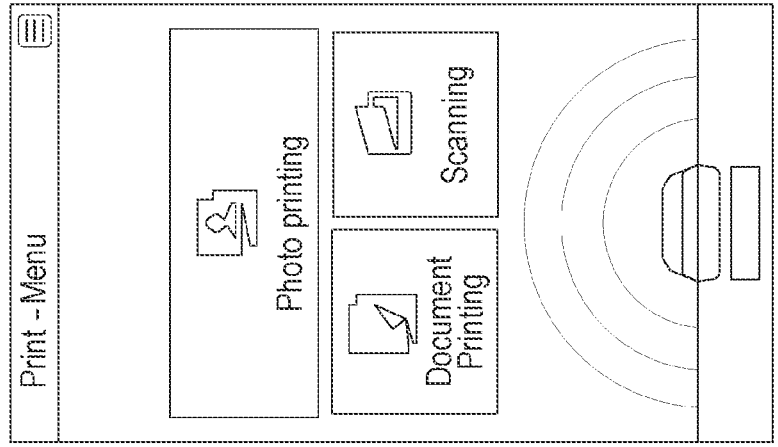

In the terminal 200, the print application is activated, whereby the screen in FIG. 9A is displayed. When a user selects photo printing, the print application displays a list of images held in the terminal 200 as illustrated in FIG. 9B. When document printing is selected, a list of documents held in the terminal 200 is displayed.

In the state in which the user selects images to be printed, in FIG. 9B, when the user performs an NFC touch operation on the printer 300 by using the terminal 200, the print application displays the screen in FIG. 9C. Performing an NFC touch operation causes the process in FIG. 7 of the present application as described above to be performed.

Figures 9D, 9E:
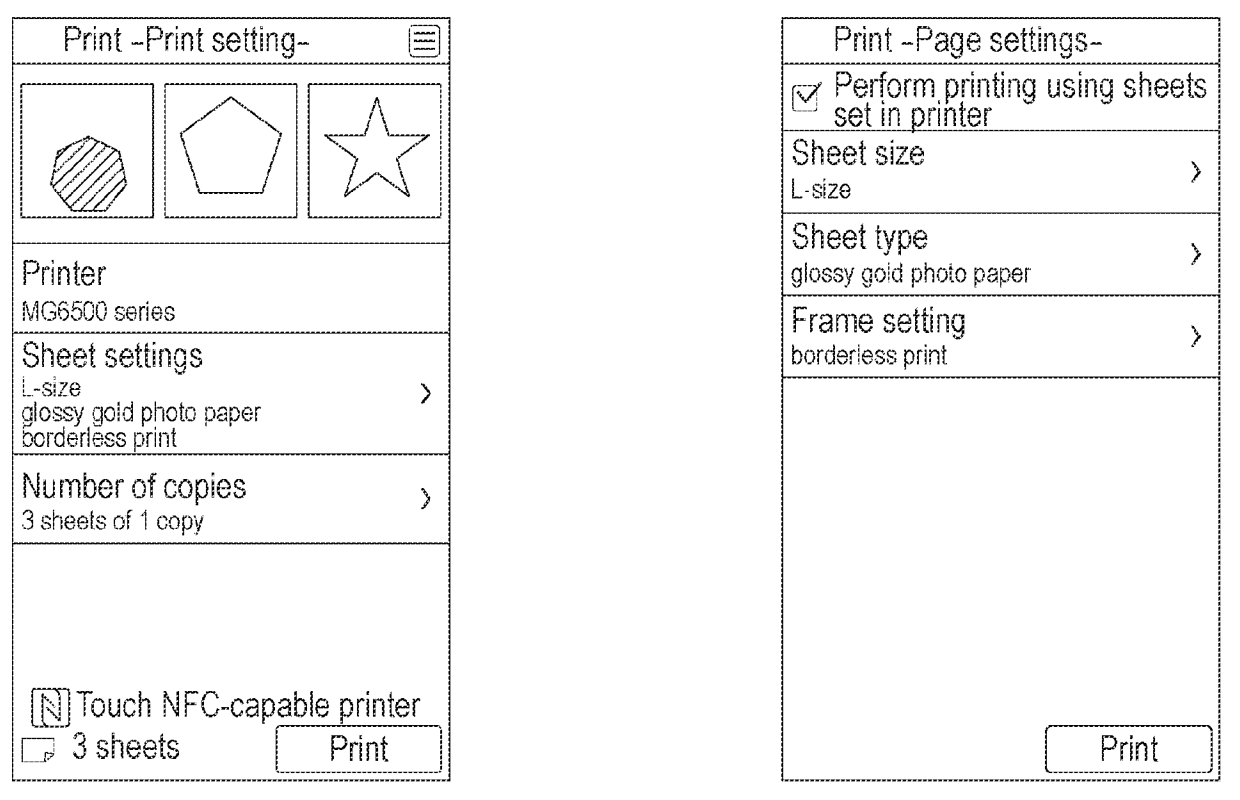

In the state in which the user selects images to be printed, in FIG. 9B, when the print button is pressed, the screen in FIG. 9D is displayed. In the state in which the screen in FIG. 9D is displayed, when the user performs an NFC touch operation on the printer 300 by using the terminal 200, printing is performed by using the print setting information displayed in FIG. 9D.

A user may register a printer for the print application. In the state in which the screen in FIG. 9D is displayed, when the user performs an NFC touch operation on a printer 300 different from the registered printer, the screen in FIG. 9E is displayed. At that time, the process in FIG. 7 causes a wireless connection between the terminal 200 and the printer 300 to be established. The terminal 200 obtains function information of the printer 300 (for example, the paper size and the paper type which may be handled by the printer 300) through the wireless connection, and reflects the obtained result on the screen in FIG. 9E. That is, the options displayed when a user presses the paper size field or the paper type field are determined on the basis of the function information of the printer 300 which is obtained through the wireless connection. In the screen in FIG. 9E, after the user sets the print setting information, when the user presses the print button, a print job is transmitted through the wireless connection to the printer 300 on which the user has performed an NFC touch operation.

Second Embodiment

In the first embodiment, when the terminal 200 and the printer 300 are not present in the same network, the terminal 200 instructs the printer 300 to make a transition to the AP mode. However, if it is possible for the printer 300 to be connected again to the access point to which the terminal 200 has been connected, the printer 300 may be connected again to the access point.

Figure 8:
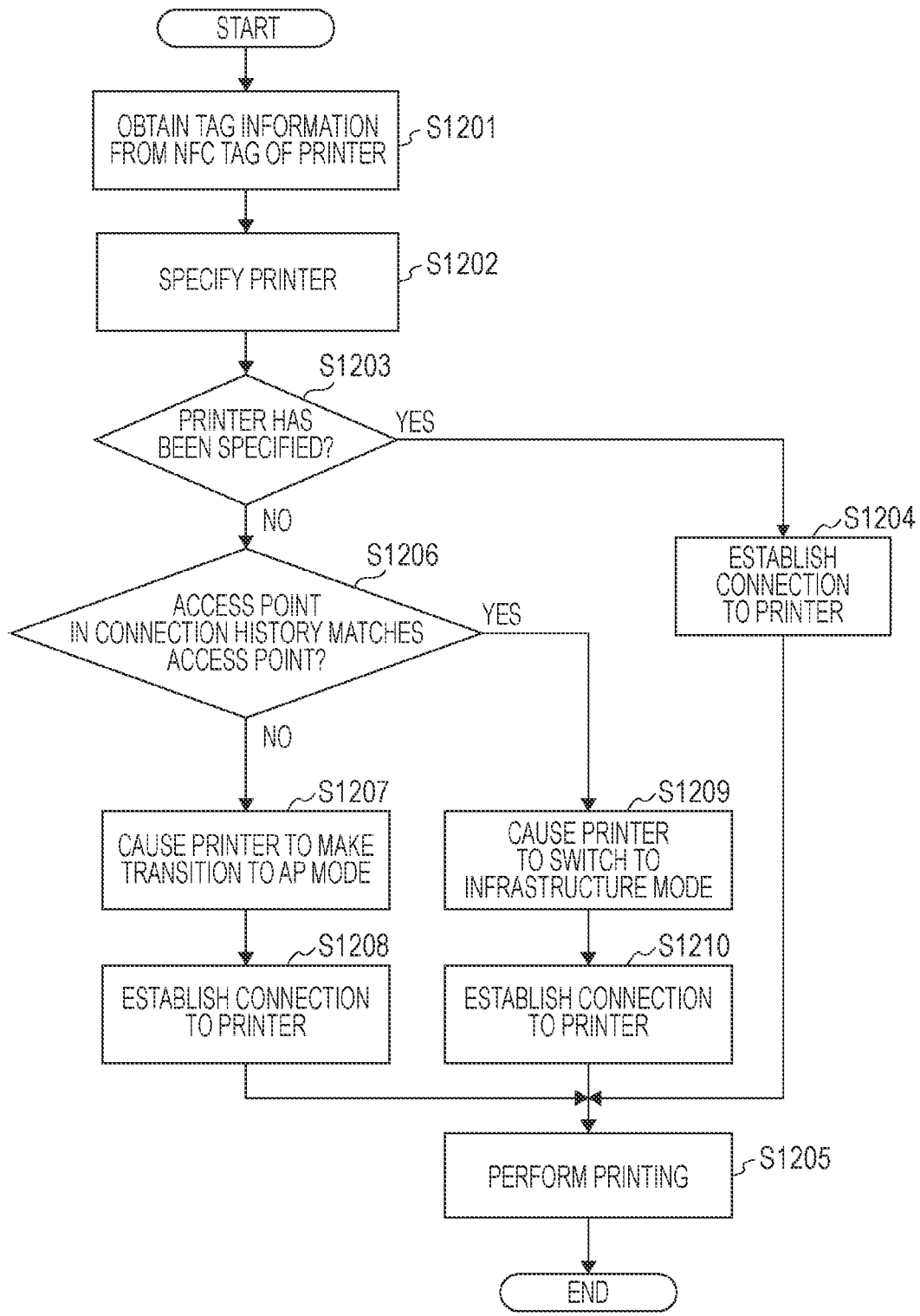
FIG. 8 is a flowchart of a process performed in a second embodiment.

Unless otherwise specified, the configurations of the apparatuses in the second embodiment are equivalent to those in the first embodiment, and will not be described. Description will be made below by using FIG. 8.

In step S1201, the terminal 200 obtains tag information from the NFC tag of the printer 300. The tag information includes four types of information about network settings of the printer 300. Specifically, in addition to the information (1) to (3) described above, information (4) which describes a connection history of SSIDs corresponding to access points to which the printers 300 was connected is included. For the information (4) about a connection history, passwords corresponding to the SSIDs are separately held in the printer 300, not in the tag.

Step S1202 is the same as step S1104, and step S1203 is the same as step S1105. Accordingly, the detailed description will not be made. If a printer 300 is not detected in step S1203, the process proceeds to step S1206 from step S1203.

In step S1206, the SSID of the access point to which the terminal 200 has been connected is compared with the connection history of SSIDs of access points which is included in the information (4) obtained in step S1201, and whether or not an SSID in the connection history matches the SSID is checked. If no SSIDs match the SSID, the process proceeds to step S1207. If an SSID matches the SSID, the process proceeds to step S1209.

The processes in steps S1207, S1208, and S1205 are the same as those in steps S1107, S1108, and S1109, and the detailed description will not be made. If it is determined that the determination result in step S1206 is YES, the terminal 200 writes the SSID matched in step S1206 and an instruction to establish a connection to the access point, in the NFC tag of the printer 300 in step S1209. When the printer 300 detects an instruction to establish a connection to the access point, which is written in the NFC tag, the printer 300 uses the SSID specified by the terminal 200 and the password stored along with the access-point history, so as to establish a connection to the access point again. Thus, the terminal 200 and the printer 300 are connected to the same access point, thereby being connected in the same network.

In step S1210, the terminal 200 performs broadcasting to the network, detects a printer 300 whose MAC address matches the MAC address of the printer 300 which is included in the information (1) obtained in step S1201, and establishes a wireless connection to the detected printer 300. The specific process in step S1210 is the same as that in step S1106. In step S1205, the terminal 200 transmits a print job to the printer 300 via the established wireless connection. The printer 300 which has received the print job performs printing, and the process ends.

As described above, according to the second embodiment, the terminal 200 uses the connection history of access points which is held in the printer 300, enabling the terminal 200 to be connected to the printer 300 via an access point. As a result, the state in which both of the terminal 200 and the printer 300 are connectable to the Internet may be maintained with a higher probability.

In the second embodiment, the example in which a connection history of access points for the printer 300 is held is described. In contrast, the terminal 200 may hold a connection history (SSID) of access points for the terminal 200. In this case, in step S1201, instead of the connection history of SSIDs corresponding to access points for the printer 300 which is included in the information (4), the terminal 200 obtains the SSID of the access point to which the printer 300 has been connected. In step S1206, the terminal 200 compares SSIDs in the connection history of the terminal 200 with the SSID, which is obtained in step S1201, of the access point to which the printer 300 has been connected. If an SSID in the connection history matches the SSID, the terminal 200 may set the connection target to the access point for the matched SSID again.

In the embodiments of the present invention, the examples in which the present invention is applied to the printer 300 are described. Similarly to the printer, the present invention is applicable to a digital camera having a WiFi connection function and a P2P connection function. Specifically, when a terminal is to function as a remote controller of a digital camera, while connections to the Internet from the terminal and the digital camera are maintained as long as possible, for example, an operation of clicking the shutter of the connected digital camera may be performed from the terminal.

In the case where a terminal is to function as a remote controller for apparatuses, such as a network audio player and a video recorder, a remote control function may be also achieved while a connection to the Internet from each of the apparatuses is maintained as long as possible.

Therefore, the scope in which the present invention is applied is not limited to a printer.

In the embodiments, the example using the AP mode is described as an example of a P2P connection between a terminal and an apparatus. However, in the case where other P2P connection methods, such as a Bluetooth™ connection and a Wi-Fi Direct connection, hinder a connection to the Internet in both or one of the terminal and the apparatus, the present invention may be applied. As a result, an effect that an Internet connection in each of the apparatuses is maintained as long as possible may be achieved.

As an example of a P2P connection between a terminal and an apparatus, the example using the AP mode is described. However, in establishment of a P2P connection, the printer 300 does not need to function as an AP. Specifically, in a Wi-Fi Direct P2P connection, one apparatus operates as a host and the other apparatus operates as an AP. However, in the specification, which serves as an AP depends on the condition. In the present invention, when a P2P connection is enabled, the present invention may achieve the effect even if either one of the terminal and the printer serves as an AP. Therefore, the present invention is not necessarily limited to the case in which the printer serves as an AP. When a Wi-Fi Direct P2P connection is to be established in the process of the present application, negotiations are performed between the terminal and the printer, and either one of the terminal and the printer is determined to operate as an AP.

As an example of near field communication, the example using NFC is described. Instead of NFC, Bluetooth™ may be used.

In the present application, the process in which the terminal 200 uses the MAC address obtained from the printer 300, so as to search for the printer 300 is described. However, another method may be employed in which the terminal 200 obtains the IP address and the MAC address by using NFC and searches for the printer 300 by using the IP address. When the terminal 200 does not find the printer 300 by using the IP address, the terminal 200 may search for the printer 300 again by using the MAC address. This process enables the search process to be efficiently performed.

Alternatively, device information, such as the model name and the type of the printer 300, may be transmitted to the terminal 200 through NFC. When the device information of printers which may be used by the print application of the terminal 200 does not match the device information obtained through an NFC touch operation (for example, when the model names do not match each other), the print application displays an error screen. A message indicating that it is impossible to continue the printing is displayed on the error screen. On the error screen, a message indicating printers which may be used by the print application, a message for recommending use of another print application, or the like may be displayed.

In addition, function information of the printer 300 may be transmitted to the terminal 200 through NFC. When a function selected in the screen in FIG. 9A provided by the print application of the terminal 200 is not included in the function information obtained through an NFC touch operation, the print application displays an error screen. A message indicating that it is impossible to continue the process may be displayed on the error screen. Specifically, in the case where faxing is selected in FIG. 9A, and where a scan function is not included in the function information obtained from the printer 300 through an NFC touch operation, the print application stops the FAX process and displays an error screen.

Third Embodiment

In the first embodiment, in the case where the WiFi setting of the terminal 200 is enabled and where the printer 300 has not established a WiFi connection, the process proceeds to step S1107 via steps S1101 to S1105. At that time, in step S1107, the terminal 200 writes an instruction to make a transition to the AP mode, in the NFC tag of the printer 300, causing the printer 300 to make a transition to the AP mode. Therefore, for a period from the start of the process in step S1101 to the end of the process in step S1107, a user should not move the terminal 200 away from the printer 300. Specifically, the distance between the terminal 200 and the printer 300 should be a distance with which NFC communication may be performed.

Before the terminal 200 completes the process in step S1107, the user may change the position of the terminal 200 which is being touched, or may move the terminal 200 away from the printer 300. As a result, NFC communication may fail to be performed in step S1107, and an instruction to make a transition to the AP mode may fail to be carried out, causing the communication between the terminal 200 and the printer 300 to end up with a connection error. When a connection error occurs in step S1107, the user performs a touch operation again, and the flow from steps S1101 to S1107 is performed again. At that time, simple repetition of the same processes alone may cause another connection error because the user moves the terminal 200 away from the printer 300 or changes the position of the terminal 200 again.

When a connection error occurs in step S1107, a process for reducing the probability of occurrence of a connection error may be performed.

Unless otherwise specified, the configurations of the apparatuses in a third embodiment are equivalent to those in the first embodiment, and will not be described. Description will be made below by referring to FIG. 10.

Figure 10:
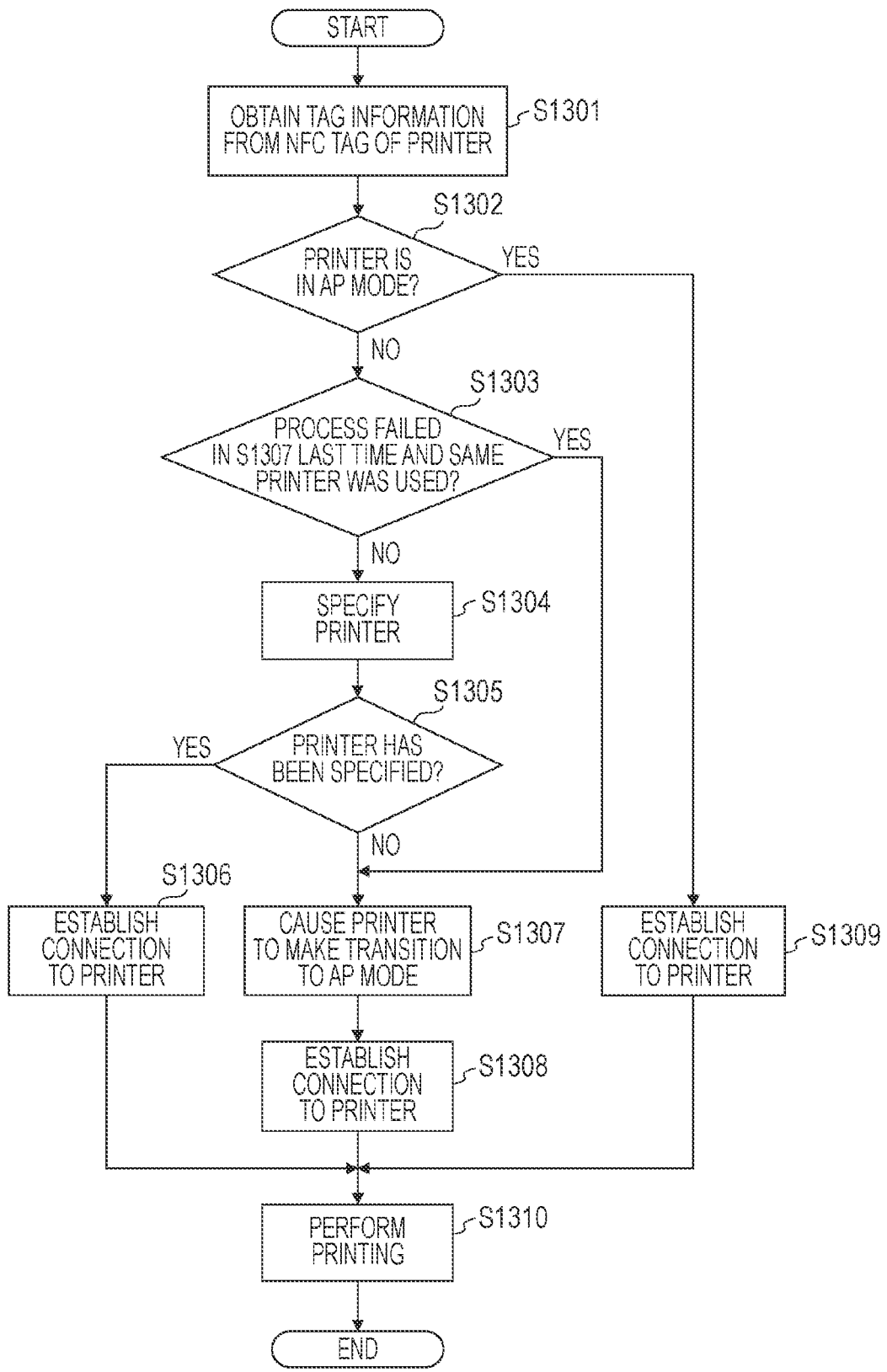
FIG. 10 is a flowchart of a process performed in a third embodiment.

Before the process illustrated in FIG. 10 is described, assume the following case. A user performs an NFC touch operation on the printer 300 by using the terminal 200 so as to try to establish a connection. Before the process in step S1107 is completed, the user moves the terminal 200 away from the printer 300. In this case, the printer 300 has not adequately received an instruction to make a transition to the AP mode. Therefore, the printer 300 has not made a transition to the AP mode. As a result, the terminal 200 fail to establish a connection to the printer 300. At that time, the terminal 200 holds connection error information in the nonvolatile memory 221 in the terminal 200. The connection error information is updated at the end of the process in step S1307 described below. When a connection error for the printer 300 occurs in the process in step S1307, the MAC address of the printer 300 on which the failed operation of establishing a connection was performed is stored along with a setting value indicating the occurrence of a connection error. If a connection error does not occur in step S1307, a setting value indicating that no connection errors occur is stored. When the process in step S1307 has never performed, a setting value for the case in which no connection errors occur is stored as an initial value.

A process flow using the error information will be described.

In step S1301, the terminal 200 obtains tag information from the NFC tag of the printer 300. The tag information includes three types of information about network settings of the printer 300, which are similar to those in the first embodiment.

Steps S1302 and S1309 are the same as steps S1103 and S1112, and will not be described in detail.

In step S1302, if it is determined that the printer 300 is not in the AP mode, the process proceeds to step S1303.

In step S1303, the terminal 200 obtains the connection error information stored in the terminal 200. The terminal 200 determines whether or not the following condition is satisfied: (1) the connection error information includes a setting value indicating that an error occurred, and (2) the MAC address of the printer 300 obtained in step S1301 matches the MAC address of the printer 300 included in the error information. If it is determined that the determination result in step S1303 is YES, the terminal 200 skips steps S1304 to S1305, and proceeds the process to step S1307.

If it is determined that the determination result in step S1303 is NO, the process proceeds to step S1304. Steps S1304 to S1306 are the same processes as those in steps S1104 to S1106, and will not be described in detail.

In step S1307, a process equivalent to that in step S1107 is performed, and the connection error information is updated at the end.

Step S1310 is the same process as that in step S1109, and will not be described in detail.

As described above, in the third embodiment, when a connection error due to an NFC touch occurred last time, the process (which is the process in step S1305, and which is also referred to as a determination process) in which a printer is specified and which relatively takes time may be skipped. As a result, a time till an instruction to make a transition to the AP mode is supplied when touching is performed again may be reduced. Thus, even in the case where a user moves the terminal 200 away from the printer 300 just after the user performs a touch operation, the probability of producing another connection error may be reduced.

When a connection error occurs, a user is highly likely to perform another touch operation at once. Therefore, time information about when the error occurred may be included in the connection error information. Specifically, in the determination in step S1303, the current time is compared with the time information which indicates when an error occurred and which is included in the connection error information. If the difference between the time when an error occurred last time and the current time is within a predetermined time (for example, within 10 seconds) and if the MAC addresses match each other, the process may proceed to step S1307.

The current connection state of the printer 300 may be used in the determination condition. Specifically, the tag information obtained in step S1301 includes information about whether or not the printer 300 has been connected in the infrastructure mode. This information is stored as the connection error information when an error occurs. In the determination in step S1303, if a connection error occurred in step S1307 last time and if the state of the wireless mode which is obtained in step S1301 matches the state of the wireless mode which is included in the connection error information, the process proceeds to step S1307.

In step S1303, the determination condition for determining whether or not the process skips the process of specifying a printer 300 and proceeds to step S1307 may be one of the conditions of, for example, the MAC address, the elapsed time, and a change in the connection state of the printer 300, or may be a combination of these. The determination condition itself may be any as long as it is information from which it may be determined that the state of the printer 300 is possibly changed, such as a change of the IP address of the printer 300 or a change of the SSID in the AP mode.

The present invention enables customer convenience to be improved by performing wireless communication in consideration of the connection state of a communication target apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A control method of a terminal apparatus capable of wirelessly connecting with an external access point provided externally to the terminal apparatus and externally to a communication apparatus and with the communication apparatus, the control method comprising:

executing second wireless communication for communication by direct wireless connection without executing first wireless communication with the communication apparatus, in a case where the communication apparatus is operated in a predetermined state that an access point included in the communication apparatus is enabled, wherein the direct wireless connection is connection between the access point included in the communication apparatus and the terminal apparatus without using the external access point; and executing, based on the first wireless communication, third wireless communication for communication by connection between the communication apparatus and the terminal apparatus via the external access point, in a case where the terminal apparatus is connecting with the external access point, wherein the first wireless communication is executed by a shorter range communication method with a communication range shorter than a communication range of the second wireless communication, and wherein the first wireless communication is communication by Bluetooth.

2. The control method according to claim 1,
wherein the third wireless communication is executed in a case where the terminal apparatus is connecting with the external access point and the communication apparatus is included in the network including the terminal apparatus and the external access point.

3. The control method according to claim 2, further comprising:

executing predetermined processing of broadcasting a predetermined command to the network including the terminal apparatus and the external access point; and determining whether a response to the predetermined command is obtained from the communication apparatus by the predetermined processing, wherein the communication apparatus is included in the network including the terminal apparatus and the external access point in a case where it is determined that the response to the predetermined command is obtained from the communication apparatus by the predetermined processing, and the communication apparatus is not included in the network including the terminal apparatus and the external access point in a case where it is determined that the response to the predetermined command is not obtained from the communication apparatus by the predetermined processing.

4. The control method according to claim 3, wherein the predetermined processing is not executed in a case where the communication apparatus is not operated in the predetermined state, and the predetermined processing is executed in a case where the communication apparatus is operated in the predetermined state.

5. The control method according to claim 3,
wherein identification information about the communication apparatus is obtained by the first wireless communication, and wherein it is determined that the response to the predetermined command is obtained from the communication apparatus by the predetermined processing in a case where information matching the identification information obtained by the first wireless communication is obtained by the predetermined processing, and it is determined that the response to the predetermined command is not obtained from the communication apparatus by the predetermined processing in a case where the information matching the identification information obtained by the first wireless communication is not obtained by the predetermined processing.

6. The control method according to claim 5, wherein the identification information is a MAC address of the communication apparatus.

7. The control method according to claim 1,
wherein information indicating whether the communication apparatus is operated in the predetermined state is obtained from the communication apparatus by a communication by the shorter range communication method, and wherein the second wireless communication is executed without executing the first wireless communication, in a case where information indicating that the communication apparatus is operated in the predetermined state is obtained from the communication apparatus by the communication by the shorter range communication method.

8. The control method according to claim 1, wherein an instruction is issued to operate the communication apparatus in the predetermined state by the first wireless communication in a case where the communication apparatus is not operated in the predetermined state and the communication apparatus is not included in a network including the terminal apparatus and the external access point.

9. The control method according to claim 1, wherein the second wireless communication is executed based on a communication by the shorter range communication method.

10. The control method according to claim 1, further comprising:

receiving selection of an image;
executing fourth wireless communication for transmitting a printing job by direct wireless connection after executing the first wireless communication with the printer after the selection of the image is received, in a case where, after the selection of the image is received, the printer is not operated in the predetermined state and the printer is not included in a network including the communication apparatus and the external access point.

11. The control method according to claim 10,
wherein the second wireless communication is executed without executing the first wireless communication after the selection of the image is received in a case where, after the selection of the image is received, a setting of wireless communication to be used for transmitting the print job is enabled in the terminal apparatus and the communication apparatus is operated in the predetermined state, wherein the third wireless communication is executed, in a case where, after the selection of the image is received, the setting of the wireless communication to be used for transmitting the print job is enabled in the terminal apparatus, the communication apparatus is not operated in the predetermined state, and the communication apparatus is included in the network including the terminal apparatus and the external access point, wherein the fourth wireless communication is executed after the first wireless communication with the communication apparatus after the image is selected is executed, in a case where, after the selection of the image is received, the setting of the wireless communication to be used for transmitting the print job is enabled in the terminal apparatus, the communication apparatus is not operated in the predetermined state, and the communication apparatus is not included in the network including the terminal apparatus and the external access point, and wherein fifth wireless communication for transmitting the print job by the direct wireless communication is executed after the first wireless communication with the communication apparatus after the image is selected is executed, in a case where, after the selection of the image is received, the setting of the wireless communication to be used for transmitting the print job is disabled.

12. The control method according to claim 11, wherein the setting of the wireless communication to be used for transmitting the print job is to be enabled, in a case where, after the selection of the image is received, the setting of the wireless communication to be used for transmitting the print job is disabled.

13. The control method according to claim 12, wherein the fourth wireless communication is executed based on a fact that the communication apparatus is not included in the network including the terminal apparatus and the external access point.

14. The control method according to claim 1, wherein the third wireless communication is executed based on a fact that the communication apparatus is included in a network including the terminal apparatus and the external access point.

15. The control method according to claim 1, wherein information for establishing the direct wireless communication is obtained from the communication apparatus by a communication by the shorter range communication method.

16. The control method according to claim 1, wherein the second wireless communication is communication by Wi-Fi.

17. The control method according to claim 1, wherein the communication apparatus is a printer.

18. A non-transitory computer-readable medium storing therein a control program which when executed by a computer executes the control method according to claim 16.

19. A terminal apparatus capable of wirelessly connecting with an external access point provided externally to the terminal apparatus and externally to a communication apparatus and with the communication apparatus, the terminal apparatus comprising:
at least one processor configured to perform:
executing second wireless communication for communication by direct wireless connection without executing first wireless communication with the communication apparatus, in a case where the communication apparatus is operated in a predetermined state that an access point included in the communication apparatus is enabled, wherein the direct wireless connection is connection between the access point included in the communication apparatus and the terminal apparatus without using the external access point; and
executing, based on the first wireless communication, third wireless communication for communication by connection between the communication apparatus and the terminal apparatus via the external access point, in a case where the terminal apparatus is connecting with the external access point,
wherein the first wireless communication is executed by a shorter range communication method with a communication range shorter than a communication range of the second wireless communication, and
wherein the first wireless communication is communication by Bluetooth.

* * * * *